US00RE34182E

United States Patent [19]

Hayasaka et al.

[11] E Patent Number: Re. 34,182

[45] Reissued Date of Patent: Feb. 23, 1993

[54] RADIO PAGER

[75] Inventors: Sigeki Hayasaka; Mamoru Takahashi, both of Tokyo, Japan

[73] Assignee: NEC Corporation, Tokyo, Japan

[21] Appl. No.: 735,217

[22] Filed: Jul. 24, 1991

Related U.S. Patent Documents

Reissue of:

[64] Patent No.: D. 304,192
Issued: Oct. 24, 1989
Appl. No.: 152,608
Filed: Feb. 5, 1988

[30] Foreign Application Priority Data

Aug. 6, 1987 [JP] Japan ..... 62-32235

[52] U.S. Cl. ..... D14/191

[58] Field of Search ..... D14/155, 168, 188, 189, D14/191, 192, 197, 198, 225, 226; 455/92, 100, 128, 351; 340/311.1

[56] References Cited

U.S. PATENT DOCUMENTS

D. 281,600 12/1985 Claxton et al. ..... D14/191
D. 284,472 7/1986 Nakatani et al. ..... D14/191
D. 286,287 10/1986 Toth et al. ..... D14/191
D. 290,608 6/1987 Fisher ..... D14/191
D. 291,310 8/1987 Ogura ..... D14/191

*Primary Examiner*—Theodore M. Shooman
*Attorney, Agent, or Firm*—Sughrue, Mion, Zinn, Macpeak & Seas

EXEMPLARY CLAIM

CLAIM

[A radio pager, as shown.] *The ornamental design for a radio pager, as shown.*

DESCRIPTION

[FIG. 1 is a front, top and right side perspective view of a radio pager showing our new design;] *FIG. 1 is a top, front and left side perspective view of a radio pager showing our new design.*

FIG. 2 is a front elevational view thereof;

FIG. 3 is a rear elevational view thereof;

FIG. 4 is a top plan view thereof;

FIG. 5 is a bottom plan view thereof;

FIG. 6 is a left side elevational view thereof; and,

FIG. 7 is a right side elevational view thereof.

1 Claim, 2 Drawing Sheets

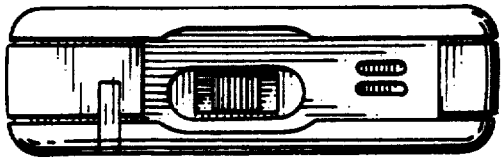
FIG. 4
FIG. 5
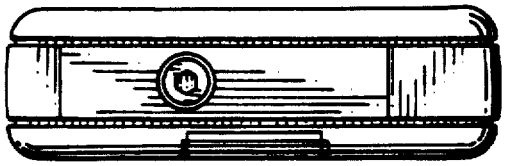
FIG. 6
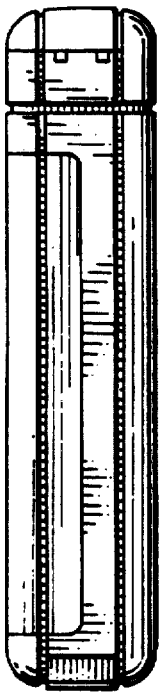
FIG. 7
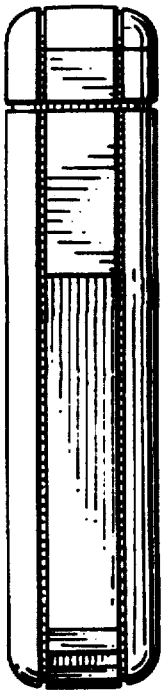

FIG. 1
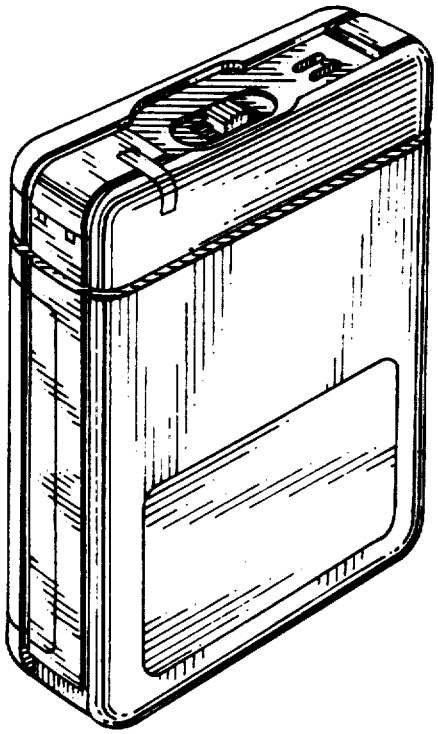
FIG. 2
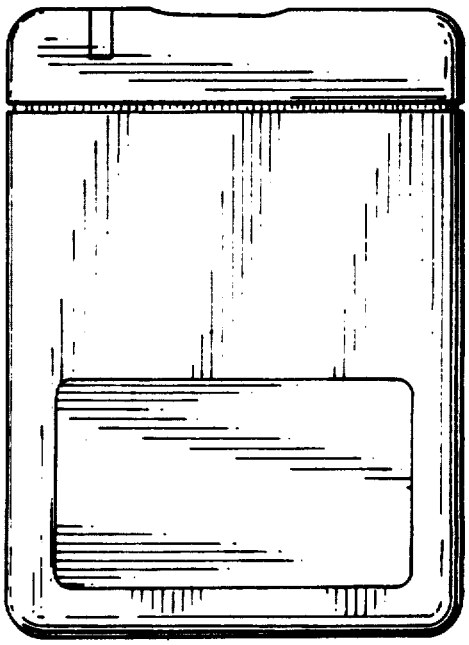
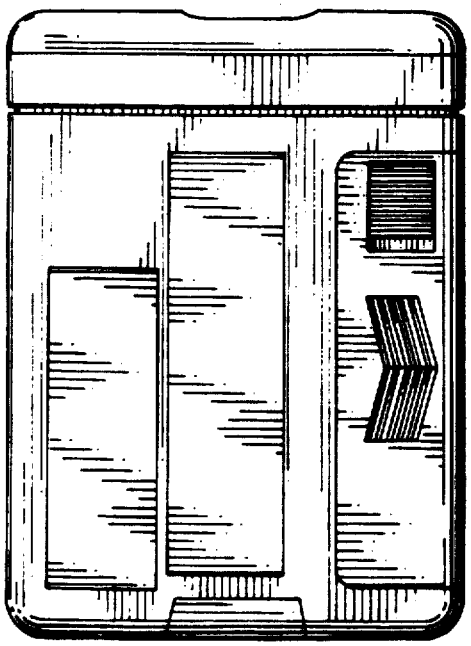
FIG. 3